United States Patent
Tazartes

(10) Patent No.: US 8,890,446 B2
(45) Date of Patent: Nov. 18, 2014

(54) AMPLITUDE CONTROL FOR VIBRATING RESONANT SENSORS

(71) Applicant: Daniel A. Tazartes, West Hills, CA (US)

(72) Inventor: Daniel A. Tazartes, West Hills, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 80 days.

(21) Appl. No.: 13/676,834

(22) Filed: Nov. 14, 2012

(65) Prior Publication Data

US 2014/0132186 A1 May 15, 2014

(51) Int. Cl.
*G01H 3/00* (2006.01)
*G01C 19/5776* (2012.01)

(52) U.S. Cl.
CPC .............. *G01H 3/00* (2013.01); *G01C 19/5776* (2013.01)
USPC ...................................... 318/116; 310/316.01

(58) Field of Classification Search
CPC ...... H03B 5/1293; H03B 5/04; H03B 5/1271; H03L 7/08; H03L 5/00; H03L 1/00; H03L 1/022; H03L 7/099; H03J 1/0008
USPC .................. 318/114, 116–118, 558; 310/300, 310/308–312, 313 A, 313 B, 316.01, 357, 310/360, 367
See application file for complete search history.

(56) References Cited

U.S. PATENT DOCUMENTS

| | | | | |
|---|---|---|---|---|
| 3,921,087 A | * | 11/1975 | Vosteen | 330/2 |
| 4,479,098 A | * | 10/1984 | Watson | 331/154 |
| 5,343,749 A | * | 9/1994 | Macy | 73/504.16 |
| 5,635,787 A | * | 6/1997 | Mori et al. | 310/321 |
| 5,652,374 A | | 7/1997 | Chia et al. | |
| 5,837,885 A | * | 11/1998 | Goodbread et al. | 73/32 A |
| 6,079,272 A | * | 6/2000 | Stell et al. | 73/504.12 |
| 7,123,111 B2 | * | 10/2006 | Brunson et al. | 331/116 M |
| 7,493,814 B2 | * | 2/2009 | Whelan et al. | 73/504.12 |
| 7,891,245 B2 | * | 2/2011 | Murakami et al. | 73/504.16 |
| 8,087,295 B2 | | 1/2012 | Netzer | |

* cited by examiner

*Primary Examiner* — Bentsu Ro
(74) *Attorney, Agent, or Firm* — Tarolli, Sundheim, Covell & Tummino LLP

(57) ABSTRACT

A system is provided for controlling the amplitude of a vibrating resonant sensor through a drive signal applied to the resonator. The system comprises a controller that provides the drive signal to a forcer coupled to the resonator to excite the resonator into vibration at its resonant frequency. The system further comprises a buffer having an input node that receives charge of a pickoff capacitor of the resonator that is a measure of the resonator vibration and a current reference waveform. The buffer provides an output that is a difference signal that represents an error of the resonator vibration that corresponds to a difference between the measured resonator vibration and the current reference waveform, wherein the controller adjusts the drive signal in order to null the difference signal.

20 Claims, 4 Drawing Sheets

AMPLITUDE CONTROL FOR VIBRATING RESONANT SENSORS

TECHNICAL FIELD

The present invention relates generally to inertial sensors, and more particularly to amplitude control for driving vibrating resonant sensors.

BACKGROUND

Coriolis Vibratory Gyroscopes (CVGs) are useful for measuring or detecting angular movement or acceleration and are based on vibrating mechanical elements which sense rotation. A resonator of a CVG is excited into vibration at its resonant frequency. The direction or orientation of vibration is somewhat dependent on rotation of the sensor so that the vibration can be analyzed to sense directional changes. An amplitude control loop is used to apply excitation energy to the resonator of the CVG and to sense the resulting vibration. A number of circuits are employed to excite the resonator to resonance and to produce an output indicative of rotational rate.

In certain CVGs, an amplitude control loop includes a low impedance buffer that extracts the charge from one or more capacitive pickoffs of a vibratory gyroscope to measure the amplitude of the resonator vibration. The resonator vibration responds to the amplitude of a drive signal supplied to one or more forcer electrodes to induce vibration in the gyroscope resonator. Capacitive pickoffs may be used to measure the vibratory displacement of the resonator through the electrical charge they produce. The charge from the capacitive pickoff(s) is transferred to an integration capacitor ($C_F$) where the charge is converted to an output voltage. That output voltage is sampled and, for the anti-nodal channels, is used to measure the amplitude of the resonator vibration. A controller adjusts the drive amplitude to maintain the measured vibration amplitude at a predetermined value. Also, by measuring both in-phase and quadrature components of the anti-nodal signal, it is possible to determine frequency error (i.e. deviation between the excitation frequency and the resonant frequency). A controller can then use this information to correct the frequency and ensure the drive tracks the resonant frequency of the CVG.

The output voltage from the integration capacitor ($C_F$) is demodulated and provided to a summer which summed in an amplitude reference signal to produce an error signal. However, the gyro scale factor (which depends on the sensor vibration amplitude) is highly sensitive to the integration capacitor in the low-Z buffer circuit. If the capacitor $C_F$ varies, then for a given vibratory displacement, the voltage generated by the buffer will vary in inverse proportion to $C_F$. The controller only has access to the voltage, thus by maintaining constant voltage amplitude, the true vibratory amplitude will in fact vary proportionally with the value of $C_F$. Since the scale factor of the gyro depends directly on the vibratory amplitude, the scale factor accuracy is impacted. Also, the value of $C_F$ is small and therefore susceptible to many parasitic effects.

SUMMARY

In accordance with an aspect of the invention, a system is provided for controlling a drive signal to a resonator. The system comprises a controller that provides the drive signal to a forcer coupled to the resonator to excite the resonator into vibration at its resonant frequency. The system further comprises a buffer having an input node that receives charge of a pickoff capacitor of the resonator that is a measure of the resonator vibration and a current reference waveform. The buffer provides an output that is a difference signal that represents an error of the resonator vibration that corresponds to a difference between the measured resonator vibration and the current reference waveform, wherein the controller adjusts the drive signal in order to null the difference signal.

In accordance with another aspect of the invention, a system is provided for controlling a drive signal to a resonator. The system comprises a controller that provides the drive signal to a forcer coupled to the resonator to excite the resonator into vibration at its resonant frequency, and a buffer having an input node that receives charge of a pickoff capacitor of the resonator that is a measure of the resonator vibration and a current reference waveform. The buffer provides an output that is a difference signal that represents an error of the resonator vibration that corresponds to a difference between the measured resonator vibration and the current reference waveform. The system further comprises a sine demodulator that demodulates a sine component of the difference signal and provides a low passed demodulated difference voltage to the controller, wherein the controller drives the low passed demodulated difference voltage to zero by adjusting a drive amplitude provided to a cosine modulator that together provide the drive signal to the forcer.

In accordance with yet another aspect of the current invention, a method is provided for controlling a drive signal to a resonator. The method comprises exciting the resonator into vibration at its resonant frequency employing a drive signal to a forcer coupled to the resonator, receiving charge of a pickoff capacitor of the resonator that is a measure of the resonator vibration, and combining a current reference waveform with the received charge to generate a difference signal. The difference signal represents an error of the resonator vibration that corresponds to a difference between the measured resonator vibration and the current reference waveform, and adjusting an amplitude of the drive signal based on the difference signal.

DETAILED DESCRIPTION

The present invention provides for the injecting of a reference waveform into an input node of a low-impedance buffer that extracts the charge from a capacitive pickoff of a vibratory gyroscope to measure the amplitude of the resonator vibration. A resultant summed signal is transferred to an integration capacitor ($C_F$) of the low impedance buffer, whereby the summed signal is converted to an output voltage. That output voltage is sampled and, for the anti-nodal channels, is used to determine the amplitude error of the resonator vibration. The output voltage signal represents an error of the resonator vibration that corresponds to a difference between the measured resonator vibration and the current reference waveform. The output voltage signal is demodulated and low-pass filtered to generate a slowly varying signal corresponding to the amplitude of the output voltage at the excitation frequency. The demodulated and low-pass filtered output voltage represents the amplitude error of the vibration signal relative to the current reference waveform and can now be driven to NULL by a controller, instead of a predetermined amplitude reference as is conventional. When the output voltage of the low impedance buffer is driven to null, it becomes completely insensitive to the precise value of the integration capacitor ($C_F$), thereby mitigating problems associated with the integration capacitor ($C_F$) stability.

Figure 1:
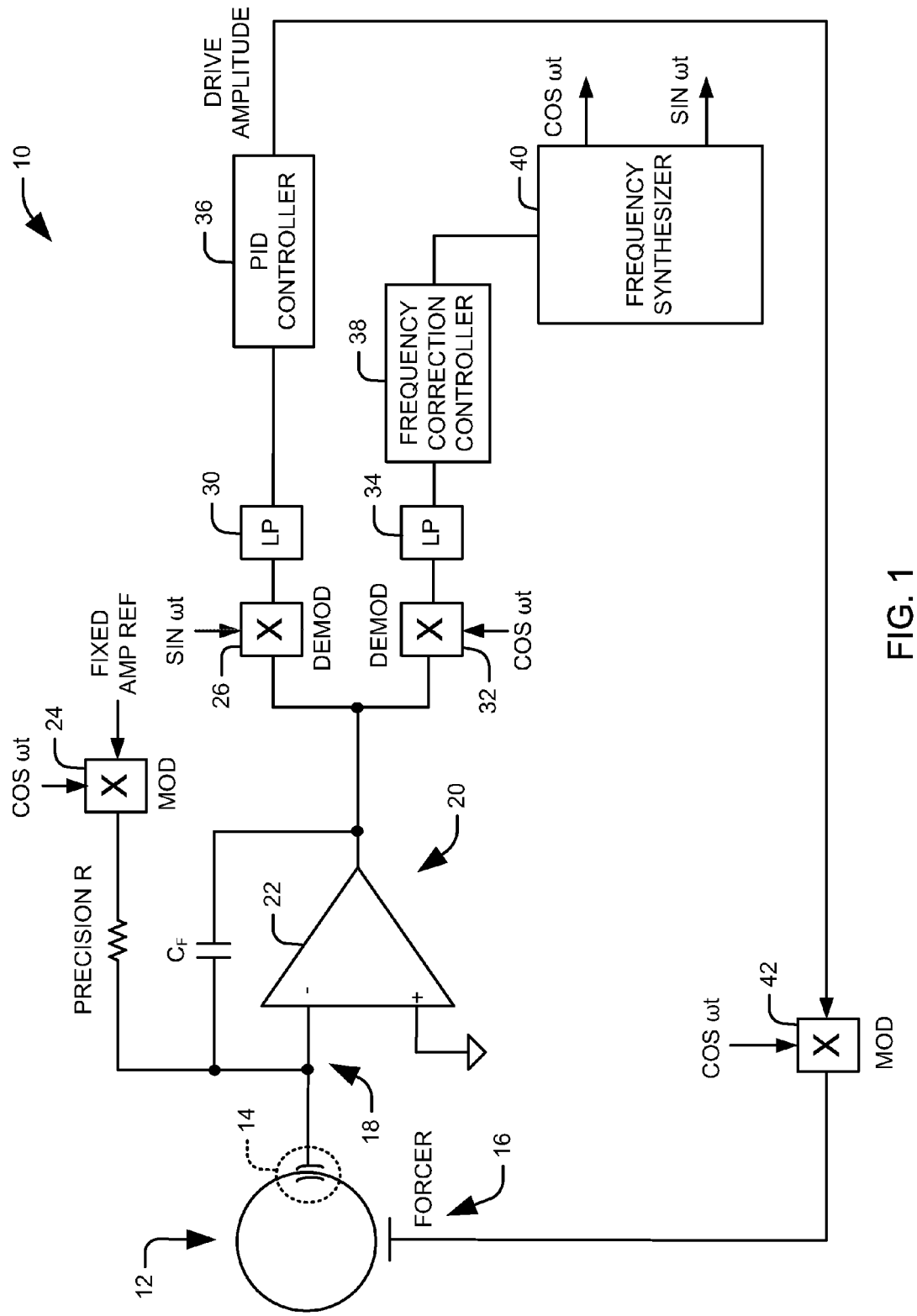
FIG. 1 illustrates a functional block diagram of a system for controlling a drive signal to a resonator in accordance with an aspect of the present invention.

FIG. 1 illustrates a functional block diagram of a system 10 for controlling a drive signal to a resonator 12 in accordance with an aspect of the present invention. The drive signal can be, for example, a drive amplitude signal. The system 10 includes a pickoff capacitor 14 formed from a wall of the resonator 12 and a capacitive pickoff electrode adjacent the wall of the resonator 12. A low-impedance buffer 20 extracts the charge from the capacitive pickoff electrode to measure the resonator vibration signal. The resonator vibration signal is responsive to a drive signal applied to a forcer electrode 16 to induce vibration at a resonator frequency of the resonator 12 of the vibratory gyroscope.

A precision current reference waveform and the charge from the capacitive pickoff are combined at an input node 18 of an operational amplifier 22 of the low impedance buffer 20 and transferred to an integration capacitor ($C_F$) of the low impedance buffer 20, where the sum or difference of the charge of the pickoff capacitor 14 and precision current reference waveform is converted to an output voltage. That output voltage is sampled and, for the anti-nodal channels, is used to measure the amplitude error of the resonator vibration. The output voltage signal from the low impedance buffer 20 represents an error of the resonator vibration waveform as compared to the current reference waveform.

The precision current reference waveform is formed from a fixed amplitude reference signal that is modulated by a modulator 24 operating at a drive frequency and based on a cosine reference signal (COS ωt) to provide a modulated reference waveform having a pre-determined constant amplitude. The output of the modulator 24 is converted to a precision current reference waveform using a precision resistor (R). Since the modulator 24 and the resistor (R) are inherently much more stable than the integration capacitor ($C_F$), the precision current reference waveform is also very stable. The precision current reference waveform is injected into the input node 18 of the low impedance buffer 20. The output of the low impedance buffer 20 is demodulated and low-pass filtered into a voltage representative of the resonator vibration signal amplitude error that is driven to NULL by a proportional-integral-derivative (PID) controller 36 instead of to a predetermined amplitude reference as is conventional.

A sine component of the error signal is demodulated by a demodulator 26 based on a sine reference signal (SIN ωt) and provided to the PID controller 36 through a low pass filter 30. The PID controller 36 adjusts the drive amplitude signal to maintain the resonator vibration amplitude at a predetermined value based on the measured error signal. The drive amplitude signal is modulated by a modulator 42 based on the (COS ωt) reference signal and provided to the forcer electrode 16 to drive the resonator vibration amplitude. A cosine component of the error signal of the low impedance buffer 20 is demodulated by a demodulator 32 based on the cosine reference signal (COS ωt) and provided to a frequency correction controller 38, which provides a frequency adjustment to a frequency synthesizer 40 by driving the cosine demodulated signal to null to maintain the drive frequency at the resonant frequency of the resonator 12 as is known in the art for controlling resonant systems. The frequency synthesizer 40 generates the cosine reference signal (COS ωt) and the sine reference signal (SIN ωt).

Figure 2:
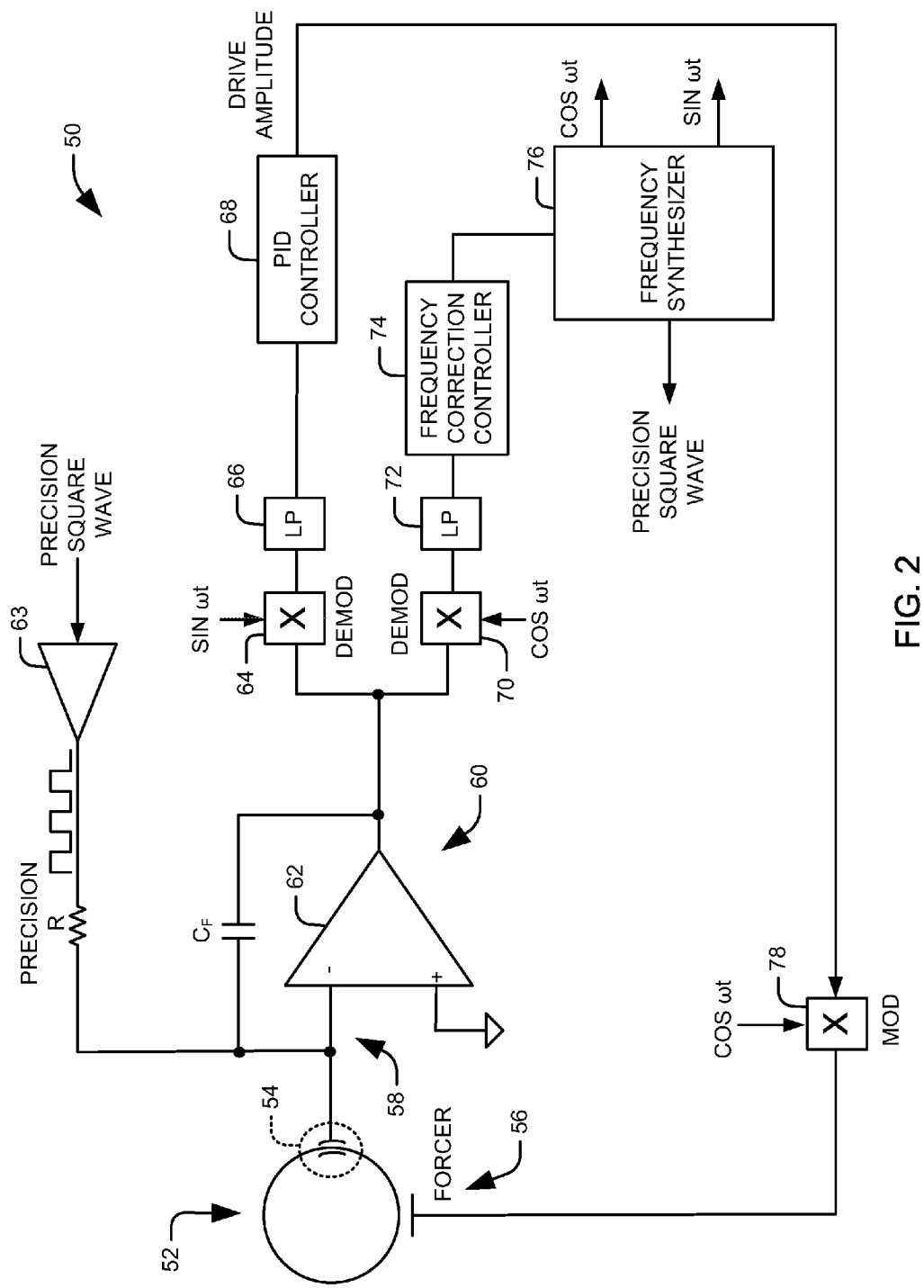
FIG. 2 illustrates a functional block diagram of another system for controlling a drive signal to a resonator in accordance with an aspect of the present invention.

In the example of FIG. 1, the vibratory amplitude in terms of current are matched to the precision reference current waveform. This ensures constant vibratory amplitude independent of the value of $C_F$. In fact, in the architecture shown in FIG. 1, $C_F$ affects the loop gain of the PID controller 36 but has no effect on the amplitude of the gyroscope, since $C_F$ is now operating on a NULL signal rather than a large amplitude signal. The null condition is achieved by the drive amplitude control loop which causes the resonator vibratory amplitude to match that of the fixed amplitude reference signal and by the frequency control loop which forces the phase of the vibratory signal to match that of the drive frequency (f of COS ωt where ω=2πf) (resonant condition). Under this null condition, depending on whether the current reference waveform is subtracted from or added to the resonator vibration signal, the resonator vibration signal will either match the reference signal, or will be 180 degrees out of phase with the reference signal. In either case, the amplitude of the resonator vibration signal will match the amplitude of the reference signal. An additional benefit of the FIG. 1 architecture is that it permits the gain of the low impedance buffer 20 to be higher (since it is operating at null), thus it should be possible to match the gains of the anti-nodal and nodal amplifiers FIG. 2 illustrates a functional block diagram of another system 50 for controlling a drive signal to a resonator 52 in accordance with an aspect of the present invention. The system 50 includes a pickoff capacitor 54 formed from a wall of the resonator and a capacitive pickoff electrode adjacent the wall of the resonator 52. A low-impedance buffer 60 extracts the charge from the capacitive pickoff electrode to measure the resonator vibration signal. The resonator vibration signal is responsive to a drive signal applied to a forcer electrode 56 to induce vibration in the resonator 52 of the vibratory gyroscope.

A precision current square waveform and the charge from the capacitive pickoff are combined at an input node 58 of an operational amplifier 62 of the low impedance buffer 60 and transferred to an integration capacitor ($C_F$) of the low impedance buffer 60, where the sum or difference of the charge of the pickoff capacitor 54 and precision current square waveform is converted to an output voltage. That output voltage is sampled and, for the anti-nodal channels, is used to measure the amplitude error of the resonator vibration. The output voltage signal from the low impedance buffer 20 represents an error of the resonator vibration compared to the current reference waveform.

The precision current square waveform is formed from an amplitude reference signal which is a precision square reference waveform with precision amplitude. In this case, the precision square reference waveform does not provide continuous instantaneous null operation, since the current from the sensor pickoffs will remain sinusoidal, but still preserves a null integrated value at the output of the low impedance buffer 60 over each cycle. However, the portions left over during cancellation due to the non-sinusoidal nature of the square waveform average to zero. Thus, this approach remains insensitive to the value of $C_F$.

A sine component of the error signal is demodulated by a demodulator 64 based on a sine reference signal (SIN ωt) and provided to a PID controller 68 through a low pass filter 66.

The PID controller 68 adjusts the drive amplitude signal to maintain the resonator vibration amplitude at a predetermined value based on the measured error signal. The drive amplitude signal is modulated by a modulator based on the cosine reference signal (COS ωt) and provided to the forcer electrode 56 to drive the resonator vibration amplitude. A cosine component of the error signal is demodulated by a demodulator 70 based on the cosine reference signal (COS ωt) and provided to a frequency correction controller 74, which provides a frequency adjustment to a frequency synthesizer 76 by driving the cosine demodulated signal to null to maintain the drive frequency at the resonant frequency of the resonator 52. The frequency synthesizer 76 generates the cosine reference signal (COS ωt), the sine reference signal (SIN ωt) and the precision square reference waveform at the same frequency.

Figure 3:
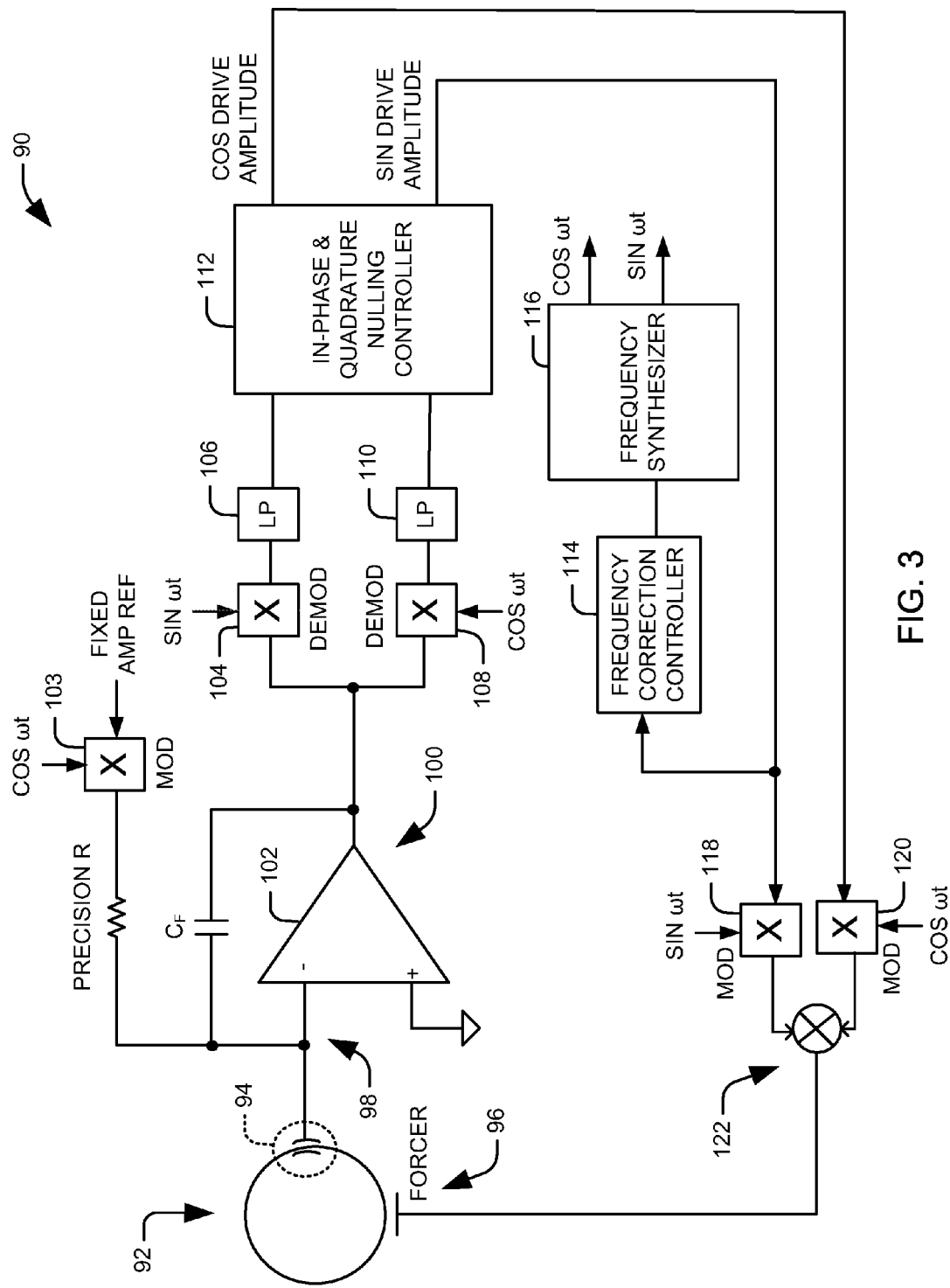
FIG. 3 illustrates a functional block diagram of yet another system for controlling a drive signal to a resonator in accordance with an aspect of the present invention.

FIG. 3 illustrates a functional block diagram of yet another system 90 for controlling a drive signal to a resonator 92 in accordance with an aspect of the present invention. Similarly to the system 10 illustrated in FIG. 1, the system 90 includes a pickoff capacitor 94, low impedance buffer 100, and a drive signal to a forcer electrode 96 to induce vibration in the resonator of the vibratory gyroscope. The system 90 also includes a precision current reference waveform formed from a fixed amplitude reference signal that is modulated by a modulator 103 operating at a drive frequency and based on a cosine reference signal (COS ωt). The precision current reference waveform is provided to an input node 98 of the low impedance buffer 100 that is an input of an operational amplifier 102 to mitigate stability issues associated with the integration capacitor ($C_F$). Alternatively, a precision current square waveform, as illustrated in FIG. 2, could be employed to mitigate issues associated with $C_F$ sensitivity.

A sine component of the error signal of the low impedance buffer 100 is demodulated by a demodulator 104 based on a sine reference signal (SIN ωt) and provided to an in-phase and quadrature nulling controller 112 through a low pass filter 106. A cosine component of the error signal of the low impedance buffer is demodulated by a demodulator 108 based on the cosine reference signal (COS ωt) and provided to the in-phase and quadrature nulling controller 112 through a low pass filter 110. The in-phase and quadrature nulling controller 112 is used to drive the resonator with both a sine and a cosine phase to achieve a vibratory signal matching the fixed amplitude reference signal. A controller of this type is described in commonly owned U.S. Pat. No. 4,981,351, entitled "RING LASER GYROSCOPE DITHER DRIVE SYSTEM AND METHOD", the entire contents of which is hereby incorporated by reference herein. The advantage of this approach, although more complex from a controls point of view, is that it affords greater bandwidth for controlling the resonator amplitude and better rejection of cross-coupled mechanical signals.

At resonance, the sine phase drive amplitude should be zero, thus the amplitude of the sine phase drive can be used to measure frequency error. A frequency correction controller 114 adjusts the frequency provided to a frequency synthesizer 116 ultimately to keep the sine phase drive minimized. The frequency synthesizer 116 generates the cosine reference signal (COS ωt), and the sine reference signal (SIN ωt). The cosine drive amplitude is modulated by a modulator 120 based on the cosine reference signal (COS ωt) and the sine drive amplitude is modulated by a modulator 118 based on the sine reference signal (SIN ωt). The modulated cosine and sine drive amplitude signals are combined by a combiner 122 and provided to the forcer electrode 96 to drive the resonator vibration.

Figure 4:
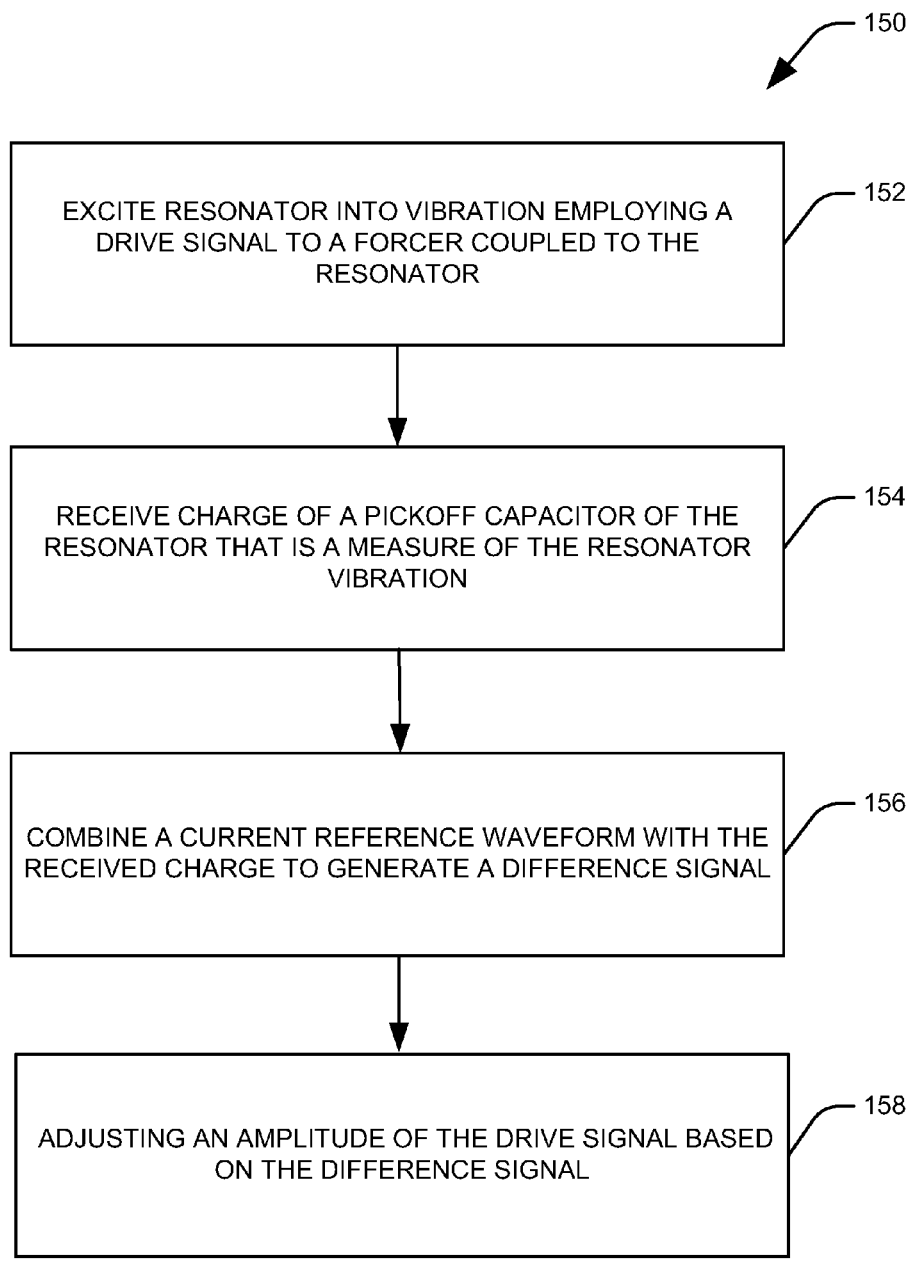
FIG. 4 illustrates a method for controlling a drive signal to a resonator in accordance with an aspect of the present invention.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described.

FIG. 4 illustrates a method 150 for controlling a drive signal to a resonator in accordance with an aspect of the present invention. The method begins at 152 where a resonator of a vibratory gyroscope is excited into vibration at its resonant frequency employing a drive signal to a forcer coupled to the resonator. At 154, charge of a pickoff capacitor is received that is a measure of the resonator vibration. At 156, a current reference waveform is combined with the received measured charge from the pickoff capacitor to generate a difference signal. At 158, an amplitude of the drive signal is adjusted based on the difference signal. The difference signal provides an error between the measured vibration signal and the current reference waveform. The difference signal is demodulated to generate an error signal which is a measure of the amplitude error. The error signal can now be driven to NULL by a controller to ensure the resonator vibration signal amplitude is maintained at the desired value, matching the current reference waveform amplitude. The current reference waveform can be provided from a fixed amplitude reference signal that is cosine modulated and provided through a precision resistor. Alternatively, the current reference waveform can be provided from a precision square wave through a precision resistor.

What have been described above are examples of the invention. It is, of course, not possible to describe every conceivable combination of components or methodologies for purposes of describing the invention, but one of ordinary skill in the art will recognize that many further combinations and permutations of the invention are possible. For example, COS ωt and SIN ωt may be interchanged depending on the specific details of the resonator and the configuration of the circuitry. Accordingly, the invention is intended to embrace all such alterations, modifications, and variations that fall within the scope of this application, including the appended claims. In addition, while the above example description of the invention is provided for a vibratory gyro, it is understood that the invention could also apply to other vibratory sensors requiring amplitude control.

What is claimed is:

1. A system for controlling a drive signal to a resonator, the system comprising:
   a controller that provides the drive signal to a forcer coupled to the resonator to excite the resonator into vibration at its resonant frequency; and
   a buffer having an input node that receives charge of a pickoff capacitor of the resonator that is a measure of the resonator vibration and a current reference waveform that are combined at the input node and provides an output that is a difference signal that represents an error of the resonator vibration that corresponds to a difference between the measured resonator vibration and the current reference waveform, wherein the controller adjusts the drive signal based on the output provided from the buffer in order to null the difference signal.

2. The system of claim 1, wherein the buffer is formed from an operational amplifier that includes an input terminal coupled to the input node and an integration capacitor coupled between the input node and an output of the operational amplifier.

3. The system of claim 1, wherein the current reference waveform is provided from a fixed amplitude reference signal that is cosine modulated and provided to the buffer input node through a precision resistor.

4. The system of claim 1, wherein the current reference waveform is provided from a precision square wave and provided to the input node through a precision resistor.

5. The system of claim 1, wherein the difference signal is sine demodulated and provided to the controller as a voltage that the controller attempts to drive to zero by adjusting the drive amplitude provided to a cosine modulator that together generate the drive signal to the forcer.

6. The system of claim 1, wherein the difference signal is cosine demodulated and provided to a frequency correction controller to adjust the frequency of modulated reference signals of the system generated by a frequency synthesizer.

7. The system of claim 1, wherein the difference signal is sine demodulated and provided to the controller and cosine demodulated and provided to the controller.

8. The system of claim 7, wherein the controller is an in-phase and quadrature nulling controller that provides a first drive amplitude that is cosine modulated and a second drive amplitude that is sine modulated with both cosine and sine modulated signals being combined to provide the drive signal.

9. The system of claim 8, wherein the second drive amplitude is provided to a frequency correction controller to adjust the frequency of modulated reference signals of the system generated by a frequency synthesizer.

10. A system for controlling a drive signal to a resonator, the system comprising:
a controller that provides the drive signal to a forcer coupled to the resonator to excite the resonator into vibration at its resonant frequency;
a buffer having an input node that receives charge of a pickoff capacitor of the resonator that is a measure of the resonator vibration and a current reference waveform and provides an output that is a difference signal that represents an error of the resonator vibration that corresponds to a difference between the measured resonator vibration and the current reference waveform; and
a sine demodulator that demodulates a sine component of the difference signal and provides a low passed demodulated difference voltage to the controller, wherein the controller drives the low passed demodulated difference voltage to zero by adjusting a drive amplitude provided to a cosine modulator that together provide the drive signal to the forcer.

11. The system of claim 10, wherein the buffer is formed from an operational amplifier that includes an input terminal coupled to the input node and the pickoff capacitor, and an integration capacitor coupled between the input node and an output of the operational amplifier.

12. The system of claim 10, wherein the current reference waveform is provided from a fixed amplitude reference signal that is cosine modulated and provided to the input node through a precision resistor.

13. The system of claim 10, wherein the current reference waveform is provided from a precision square wave and provided to the input node through a precision resistor.

14. The system of claim 10, further comprising a cosine demodulator that demodulates a cosine component of the difference signal and provides a frequency correction signal to a frequency correction controller to adjust the frequency of modulated reference signals of the system generated by a frequency synthesizer.

15. The system of claim 10, wherein the difference signal is cosine demodulated and provided to the controller, wherein the controller is an in-phase and quadrature nulling controller that provides a first drive amplitude that is cosine modulated and a second drive amplitude that is sine modulated with both cosine and sine modulated signal being combined to provide the drive signal.

16. The system of claim 15, wherein the second drive amplitude is provided to a frequency correction controller to adjust the frequency of modulated reference signals of the system generated by a frequency synthesizer.

17. A method for controlling a drive signal to a resonator, the method comprising:
employing a drive signal to a forcer coupled to the resonator via a controller to excite the resonator into vibration at its resonant frequency;
receiving charge of a pickoff capacitor of the resonator via a buffer, the charge being a measure of the resonator vibration;
combining a current reference waveform with the received charge at an input node of the buffer to generate a difference signal that represents an error of the resonator vibration that corresponds to a difference between the measured resonator vibration and the current reference waveform; and
adjusting an amplitude of the drive signal based on the difference signal via the controller.

18. The method of claim 17, wherein the combining a current reference waveform with the received charge comprises injecting the current reference waveform into a node of a buffer that is coupled to a pickoff capacitor of the resonator, the buffer being formed from an operational amplifier that includes an input terminal coupled to the input node and an integration capacitor coupled between the input node and an output of the operational amplifier.

19. The method of claim 18, wherein the current reference waveform is provided from a fixed amplitude reference signal that is cosine modulated and injected into the input node through a precision resistor.

20. The method of claim 18, wherein the current reference waveform is provided from a precision square wave and injected into the input node through a precision resistor.

* * * * *